United States Patent

[11] 3,573,458

| [72] | Inventor | Hal O. Anger |
| | | Berkeley, Calif. |
| [21] | Appl. No. | 811,027 |
| [22] | Filed | Mar. 27, 1969 |
| [45] | Patented | Apr. 6, 1971 |
| [73] | Assignee | The United States of America, as represented by the United States Atomic Energy Commission |

[54] POSITRON CAMERA WITH MULTIPLANE FOCUSING
14 Claims, 2 Drawing Figs.

| [52] | U.S. Cl. | 250/71.5, 250/83.3 |
| [51] | Int. Cl. | G01t 1/20 |
| [50] | Field of Search | 250/71.5, 83.3, 83.6 |

[56] References Cited
UNITED STATES PATENTS

| 3,011,057 | 11/1961 | Anger | 250/71.5 |
| 3,234,386 | 2/1966 | Leventhal et al. | 250/83.3 |

*Primary Examiner*—James W. Lawrence
*Assistant Examiner*—Davis L. Willis
*Attorney*—Roland A. Anderson ABSTRACT: A positron radiation detecting camera for obtaining, in one step, an image of the distribution of radioactivity at several different depths in a living subject. Several views are simultaneously presented, each view being focused at a differing plane in the subject between the image detector and focal detectors of the camera. Thus, it is not necessary to know in advance from which plane the radioactivity will emanate, since at least one image will be in focus. Also, radioactivity may emanate from several planes simultaneously. The radiation is detected as in the prior known single-plane positron camera but positional information is electronically combined in differing ratios to obtain multiplane focusing.

INVENTOR.
HAL O. ANGER

INVENTOR.
HAL O. ANGER

BY
ATTORNEY

1

POSITRON CAMERA WITH MULTIPLANE FOCUSING

BACKGROUND OF THE INVENTION

The invention described herein was made in the course of, or under, Contract No. W-7405-ENG-48, with the United States Atomic Energy Commission.

The present invention relates to a radiation sensitive camera for producing an image showing the distribution of radioactivity within a body and utilizes an image detector of the type disclosed in U.S. Pat. No. 3,011,057 issued Nov. 28, 1961 to the present inventor, whereby simultaneous multiple images with differing planes of focus are obtained without any change of the plane of focus of the camera.

It is possible to obtain multiple images by taking several successive exposures with the prior known single image positron camera, by the plane of focus being changed for each view. Such procedure has the disadvantage of greatly increasing the time that a patient must remain motionless before the camera. Furthermore, such a procedure may not be possible for use with short-lived radioactive tracer substances.

SUMMARY OF THE INVENTION

In general, the present invention provides a positron camera which produces pictures of the distribution of positron emitting nuclides in a subject, such as in a medical patient who has been administered a positron emitting radioisotope. Circuitry and electronic computational techniques provide a spot of light on an oscilloscope screen, the spot being positioned corresponding to the point from which the radiation emanated in the subject. The film in the camera, viewing the screen, stores an image of the individual spots to provide a composite image of the radioactivity distribution in the subject. An image detector and focal detector similar to those disclosed in the above referenced patent are utilized herein. The present invention takes advantage of the fact that the plane of focus is selected by electronic means, thus allowing the focal and image detector positional signals to be combined in several different ratios to obtain multiple images each having a different plane of focus. The images are all obtained from the same input information, that is, the same nuclear events.

Therefore, it is an object of this invention to provide a positron radiation detecting camera for obtaining, in one step, an image of the distribution of radioactivity at several different depths in a body.

A further object of the invention is to provide a positron detecting camera wherein the radiation is detected as in a single-plane positron camera but positional information is electronically combined in differing ratios to obtain multiplane focusing.

Another object of the invention is to obtain simultaneous multiple images, with differing planes of focus, from a positron camera.

Other objects of the invention will become readily apparent from the following description and accompanying drawing.

DESCRIPTION OF THE INVENTION

Basically, the inventive positron camera produces pictures of the distribution of positron emitting nuclides in a subject, such as in a medical patient who has been administered a positron emitting radioisotope. Whenever a positron is stopped by matter, it combines with a negative electron and produces two 0.51 Mev. annihilation gamma rays that travel from their point of origin at 180°. This property allows images to be formed with two detectors on opposite sides of the subject. The subject is placed as close as possible to a first detector, called an image detector, while a second detector, called a focal detector, is located either close or at a distance from the subject. Coincidence circuitry and electronic computational techniques are utilized to provide a spot of light on an oscilloscope screen, the spot being positioned corresponding to the point from which the radiation emanated in the subject. The film in the camera, viewing the screen, stores an image of the individual spots to provide a composite image of the radioactivity distribution in the subject.

The operation of the image and focal detectors, as pointed out above, are disclosed in the above cited U.S. Pat. No. 3,011,057, wherein a signal-sensing means (for example, several phototubes of standard manufacture) is disposed facing a signal means (for example, a scintillator) which emits a surge of signal matter (for example, visible light) in response to a signal incident radiation stimulus (for example, a single gamma ray). The phototubes are particularly spaced at a moderate distance from the scintillator so as to survey overlapping areas thereof. Thus each phototube subtends a portion of each surge of light, and each individual scintillation is reported by several of the phototubes, whereafter the electrical signals from the phototubes are compared in a computing circuit, described hereinafter.

The operation of the focal detector is very similar to the image detector, both detectors and associated circuitry providing X- and Y-axis positional signals from detected gamma rays. The X-axis signals from both detectors are combined, and similarly the Y-axis signals are combined to obtain a resultant X-and Y-signal which controls the position of the oscilloscope beam. The plane of focus is selected by the operator by choosing the amplitude ratio at which the positional signals from the detectors are combined.

The present invention takes advantage of the fact that the plane of focus is selected by electronic means, thus allowing the focal and image detector positional signals to be combined in several different ratios to obtain multiple images each having a different plane of focus. The images are all obtained from the same input information, that is, the same nuclear events.

Figure 1:
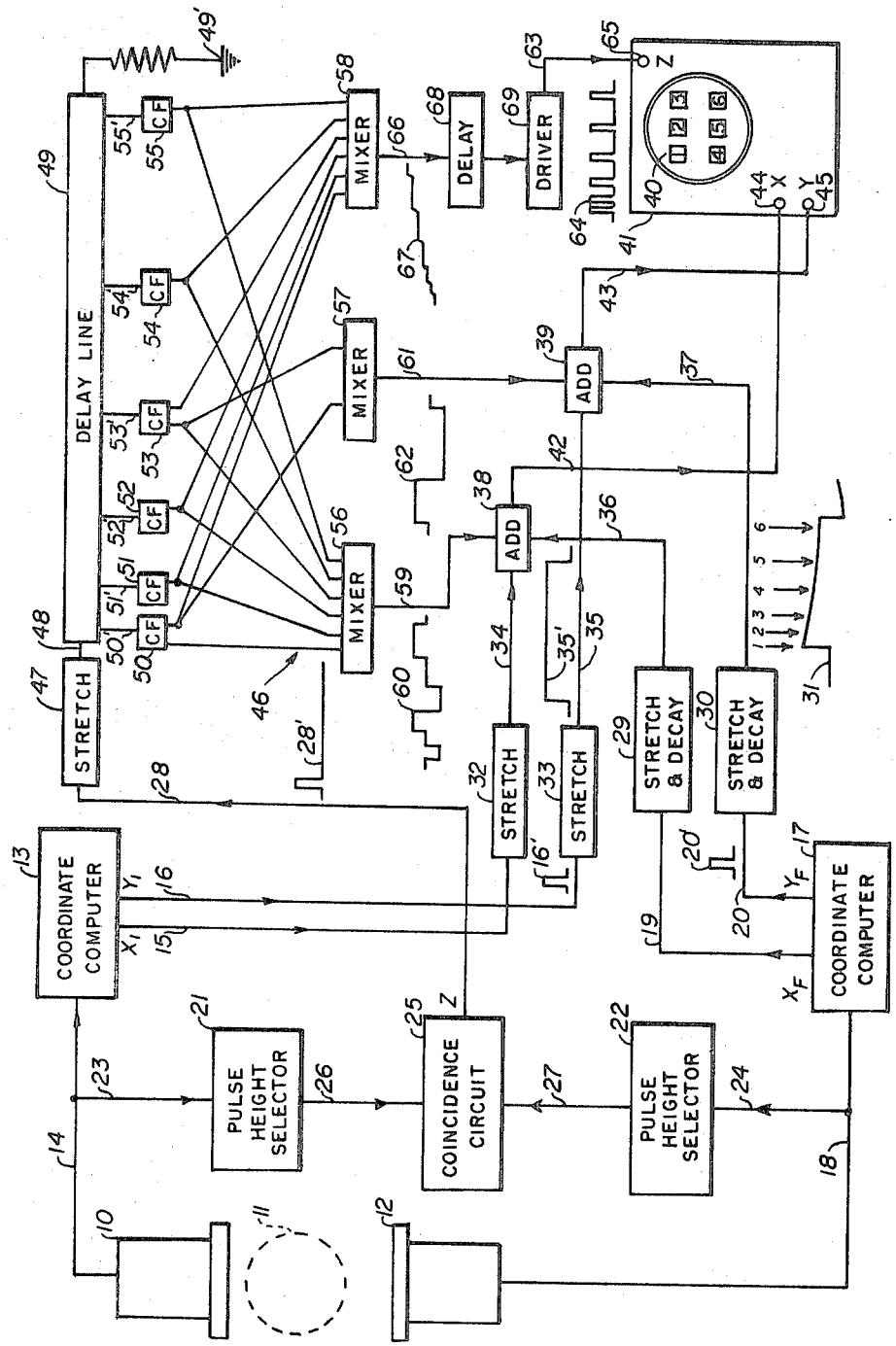
FIG. 1 is a block diagram of an embodiment of a multiplane positron camera embodying the invention.

Referring now to the FIG. 1 embodiment of the inventive concept, an image scintillator-detector assembly 10 is disposed adjacent a medical patient, for example, indicated schematically at 11, while a focal scintillator-detector assembly 12 is disposed on the opposite side of the patient 11 and may be spaced apart therefrom. An image coordinate computer 13 receives a multiplicity of signals, indicated by lead 14, from the image assembly 10 for each detected radiation, the computer 13 providing resultant $X_1$ and $Y_1$ output signals, indicated by the legends and respective leads 15 and 16, having an amplitude and polarity corresponding to the rectangular coordinates of the point on the patient 11 at which the radiation was detected. The $X_1$ and $Y_1$ output signals producing a typical resulting waveform as indicated at 16′ for the $Y_1$ signal, for example. Likewise, a focal coordinate computer 17 receives a multiplicity of signals, indicated by lead 18, and provides $X_f$ and $Y_f$ output signals, indicated by the legends and respective leads 19 and 20, corresponding to the coordinates of radiation detected at the focal assembly 12. The $X_f$ and $Y_f$ output signal also have a typical resulting waveform as indicated at 20′ for the $Y_f$ signal, for example. A pair of pulse height selectors 21 and 22 are also connected to the outputs of the image and focal assemblies 10 and 12, via leads 23 and 24, respectively, such selectors rejecting signals which have an amplitude which lies outside a preselected range. Such range is set to accept only signals having an amplitude as produced by the radiation of interest. Thus background noise may be reduced, which may be signals of different amplitude such as those caused by cosmic rays or scattered gamma rays. A coincidence circuit 25 receives the outputs 26 and 27 of pulse height selectors 21 and 22, respectively, and provides a Z output signal, indicated by the legend and lead 28, only when pulses are received simultaneously from both pulse selectors. The Z output signal produces a typical resulting waveform shown at 28′.

The above-described apparatus is generally similar to that known in the prior art, except that these prior devices do not include circuitry for obtaining simultaneous images from a series of planes as in the present invention. Considering now the novel circuitry of the present invention, the $X_f$ and $Y_f$ signals, indicated at 19 and 20, are individually stretched and allowed to decay at an exponential rate in respective pulse stretch-and-decay circuits 29 and 30, a typical resulting waveform from a $Y_f$ signal 20 being shown at 31. The $X_1$ and $Y_1$ signals, indicated at 15 and 16, are each stretched in respective pulse stretch circuits 32 and 33 and added, as indicated by respective leads 34 and 35, to the stretched and decayed $X_f$ and $Y_f$ signals, as indicated by respective leads 36 and 37, in adder circuits 38 and 39, respectively. A typical resulting waveform from a $Y_1$ signal transmitted through lead 35 is shown at 35', thus illustrating the stretch of the signal 16' being fed into the stretch circuit. The pulse stretch-and-decay circuits 29 and 30 may also be defined as stretching circuits with time varying attenuation.

In the FIG. 1 embodiment of the invention, a train of six images, numbered 1—6, are to be produced on a screen 40 of an oscilloscope 41, each image 1—6 being the result of adding the two X-signals ($X_1$ and $X_f$) and the two Y signals ($Y_1$ and $Y_f$) in differing proportions, the two X signals being added in adder circuit 38, the output thereof indicated at 42 being connected to an X terminal 44 on oscilloscope 41, the two Y-signals being added in adder circuit 39, the output thereof indicated at 43 being connected to a Y-terminal 45 on oscilloscope 41, the added signal having a waveform which is a composite of the waveform going into the adder circuits 38 and 39. The $Y_f$ value for each image 1 to 6 of the train is sampled at progressive points along the delay curve or waveform 31, the point 1—6 on the waveform 31 corresponding to the image numbers 1—6 on the oscilloscope screen 40, these points being spaced at generally equally differing increments of amplitude as shown on the waveform 31. Thus the samples are taken at unequal time intervals owing to the exponential shape of delay curve 31. While only the waveforms for the $Y_1$ and $Y_f$ and composite thereof have been shown, the corresponding X signals would have a complementary waveform.

In addition to the various X-and Y-signals resulting from the detection of the gamma rays, it is necessary to trigger a series of additional sequential X and Y signals to correctly position the various images 1—6 of the train on the screen 40 and to effect sampling of the decay curve 31. Such position signals are created in position circuitry, indicated generally at 46, wherein the Z signal, indicated at 28, from the image and focal assemblies 10 and 12, via coincidence circuit 25, is stretched in a pulse stretch circuit 47 and passed via lead 48 along a delay line 49, grounded at 49' to inputs of a plurality of cathode follower circuits (CF) 50, 51, 52, 53, 54 and 55, via respective leads 50' to 55' from which they are mixed in various combinations in mixture circuits 56, 57 and 58 to obtain an X-position signal 59, a typical resulting waveform shown at 60, and a Y-position signal 61, a typical resulting waveform shown at 62. Note that in this embodiment signals from only CF 50 and 53 are directed to mixer 57. Signals 59 and 61 are applied through adder circuits 38 and 39, respectively, to oscilloscope 41 along with the combined image and focal signals previously described. A Z intensity control or unblanking signal indicated at 63, having a typical waveform shown at 64, and applied to a Z terminal 65 on oscilloscope 41 is also obtained from the delay line 49 via mixer circuit 58 which produces a signal 66 having a waveform 67 which is transmitted through a delay circuit 68 and a driver circuit 69, the Z-signal 63 determining the times at which the decay signal 31 is sampled. Note that the peaks of waveform 64 of Z-signal 63 are spaced similar to the spacing of images 1 to 6 on decay signal waveform 31. The cathode follower connections 50' to 55' to the delay line 49 are spaced apart at unequal increments to provide the equal amplitude increments of the sample taken of the $X_f$ and $Y_f$ signals 36 and 37, as indicated in the waveform 31, these being displayed on the screen 40 of oscilloscope 41. It should be noted that each of the waveforms illustrated are for a single event (the combining of a positron with a negative electron which produces two gamma rays traveling from their point of origin at 180°, as described above).

Figure 2:
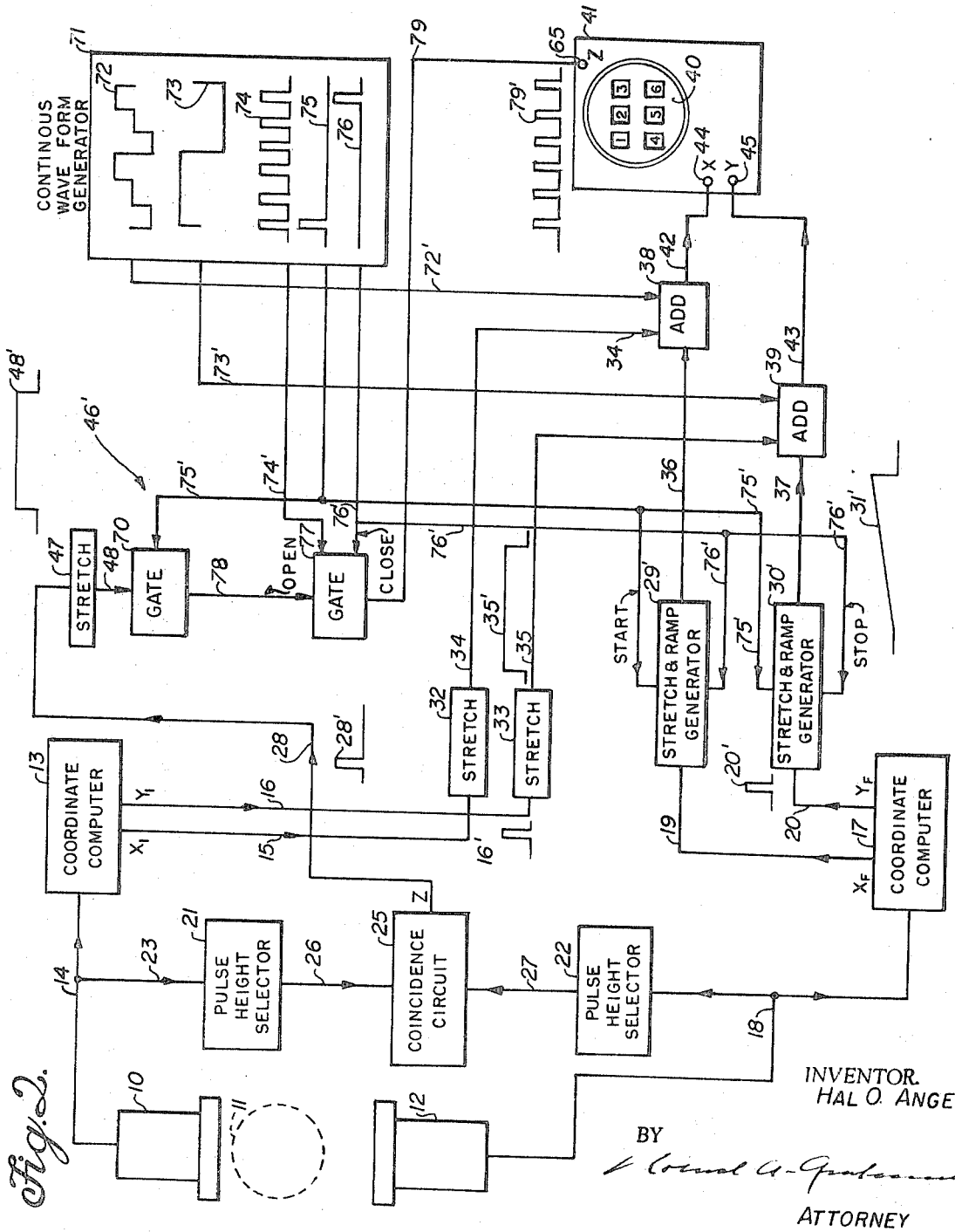
FIG. 2 is a block diagram of another embodiment of the invention.

Referring now to the FIG. 2 embodiment, like components to those of FIG. 1 will be given like reference numerals, the primary differences between the embodiments being the circuitry between the computers and the oscilloscope. As shown in FIG. 2, an image detector 10 is disposed adjacent a patient schematically shown at 11, while a focal detector 12 is disposed on the opposite side of the patient 11. An image coordinate computer 13 receives signals indicated at 14 from image detector 10 for each detected radiation, the computer 13 providing resultant $X_1$ and $Y_1$ output signals indicated respectively at 15 and 16, having an amplitude and polarity corresponding to the rectangular coordinates of the point on the patient 11 at which the radiation was detected, a typical resulting waveform for the $Y_1$ signal, for example, being shown at 16'. Likewise, a focal coordinate computer 17 receives signals indicated at 18 and provides $X_f$ and $Y_f$ output signals indicated at 19 and 20, respectively, corresponding to coordinates of radiation detected at the focal detector 12, a typical resulting waveform for the $Y_f$ signal, for example, being shown at 20'.

As in the FIG. 1 embodiment, a pair of pulse height selectors 21 and 22 are also connected to the outputs of the image and focal detectors 10 and 12 as indicated at 23 and 24, respectively, such selectors rejecting signals which have an amplitude which lies outside a preselected range, such range being set to accept only signals having an amplitude as produced by the radiation of interest. Thus background radiation may be reduced. A coincidence circuit 25 receives the outputs 26 and 27 of pulse height selectors 21 and 22, respectively, and provides a Z output signal indicated at 28, only when pulses are received simultaneously from both pulse selectors, a typical resulting waveform for the Z-signal is indicated at 28'.

As in the FIG. 1 embodiment, the above described apparatus is generally similar to that known in the prior art, except that the prior art approaches do not include circuitry for obtaining simultaneously multiple images focused on a series of planes as in the present invention. Considering now the circuitry of the FIG. 2 embodiment, the $X_f$ and $Y_f$ signals, indicated at 19 and 20, are individually stretched and varied in amplitude in respective pulse stretch-and-ramp-generator circuits 29' and 30', a typical resulting waveform from a $Y_f$ signal 20, for example, being shown at 31'. As in the stretch-and-decay circuits 29 and 30 of the FIG. 1 embodiment, the circuits 29' and 30' may also be generally defined as stretching circuits with time varying attenuation since circuits 29' and 30' as well as circuits 29 and 30 each stretch the signal and attenuate the amplitude or gain thereof, as illustrated by the associated waveform therefor. The $X_1$ and $Y_1$ signals, indicated at 15 and 16, are each stretched in respective pulse stretch circuits 32 and 33 and added, as indicated at 34 and 35, to the stretched and attenuated signals $X_f$ and $Y_f$, as indicated at 36 and 37, in adder circuits 38 and 39, respectively. A typical resulting waveform from a $Y_1$ signal, for example, indicated at 35 is shown at 35'.

In the FIG. 2 embodiment of the invention, a train of six images, numbered 1—6, are to be produced on a screen 40 of an oscilloscope 41, each image of the train 1—6 being the result of adding the two X-signals ($X_1$ and $X_f$) and the two Y-signals ($Y_1$ and $Y_f$) in differing proportions, the two X-signals being added in adder circuit 38, the output thereof indicated at 42 being connected to an X-terminal 44 on oscilloscope 41, the two Y-signals being added in adder circuit 39, the output thereof indicated at 43 being connected to a Y-terminal 45 on oscilloscope 41, the added signals being a composite of the waveforms going into the adder circuits. The $Y_f$ value for each image 1 to 6 of the train shown on screen 40 of oscilloscope 41 is sampled along the ramp or waveform 31', the sampled points on the waveform 31' corresponding to the train image numbers 1—6 on the oscilloscope screen 40. While only the waveforms for the $Y_1$ and $Y_f$ have been shown, the corresponding X-signals would have a complementary waveform.

In addition to the various X-and Y-signals resulting from the detection of the gamma rays, it is necessary to trigger a series of additional sequential X-and Y-signals to correctly position the train of images 1—6 on the screen 40 to effect sampling of the ramp or curve 31'. Such position signals are created in position circuitry, indicated generally at 46', wherein the Z-signal, indicated at 28, from the image and focal assemblies 10 and 12, via coincidence circuit 25, is stretched in a pulse stretch circuit 47 and passed as indicated at 48 to a first gate circuit 70, a typical resulting waveform from the stretched Z-signal being shown at 48'. A continuous waveform generator indicated generally at 71 producing repeated signals having waveforms as typified by the indicated waveforms 72, 73, 74, 75 and 76 only 1 cycle of each such continuous waveforms being shown. The signal or waveform 72 is passed as indicated at 72' to the X adder circuit 38, while signal or waveform 73 is passed as indicated at 73' to the Y adder circuit 39. The signal or waveform 74 is passed as indicated at 74' to a second gate circuit 77, with waveform or signal 75 being passed as indicated at 75' to each of the stretch- and ramp-generators 29' and 30' and to the first gate circuit 70, while signal or waveform 76 is passed as indicated at 76' to each of the stretch- and ramp-generator 29' and 30' and to the second gate circuit 77. An output signal from the first gate circuit 70, as indicated at 78, is directed to the second gate circuit 77, with the output signal from the second gate circuit 77, or Z intensity control signal, indicated at 79, having a typical resulting waveform 79' applied to the Z-terminal 65 on oscilloscope 41, the Z intensity control or unblanking signal 79 determining the times at which the ramp signal 31' is sampled. Note that the peaks of waveform 79' of Z-signal 79 are spaced similar to the spacing of waveform 74 of generator 71. Also note, as indicated by legends, that the signal or waveform 75' functions to open gate circuit 77 and start the sampling sequence of waveform 31' produced by the stretch- and ramp-generators 29' and 30', which the signal or waveform 76' functions to close the gate circuit 77 and stop the sampling sequence of the waveform 31'. Signals or waveforms 72' and 73' are added to the X-and Y-signals in adder circuits 38 and 39, respectively, to composite thereof forming respective signals 42 and 43 which are applied to the X-and Y-terminals 44 and 45, respectively, of oscilloscope 41. Again, each of the waveforms illustrated in FIG. 2 are for a single nuclear event as previously described or for a single cycle of the waveform generator.

It has thus been shown that the present invention provides a positron radiation detecting camera for obtaining, in one step, an image of the distribution of radioactivity at several different depths in a living subject, several views being simultaneously presented, each view being focused at a differing plane in the subject. Thus, by the utilization of the novelty system, the focal and image detector positional signals are combined in several different ratios to obtain multiple images each having a different plane of focus. The images are all obtained from the same input information, that is, the same nuclear events.

Although particular embodiments of the invention have been illustrated and described, modifications will become apparent to those skilled in the art, and it is intended to cover in the appended claims, all such modifications as come within the spirit and scope of the invention.

I claim:

1. A positron camera for obtaining simultaneous multiple images with different planes of focus comprising: image means including an image scintillator-detector assembly, focal means including a focal scintillator-detector assembly, each of said image and focal means being adapted for deriving X-and Y-coordinate position signals of gamma rays emitted from an associated subject, said image scintillator-detector assembly being adapted to be positioned closely adjacent an associated subject emitting gamma rays, said focal scintillator-detector assembly being adapted to be positioned in a predetermined spaced relation with such an associated subject, means adapted for deriving a Z intensity control signal, a pair of pulse stretching circuit means connected to receive said X- and Y-position signals from said image means, an X adder circuit means and a Y adder circuit means, said adder circuit means being coupled to said pulse stretching circuit means for receiving X-and Y-signals therefrom, a pair of pulse stretching circuit means with time varying attenuation connected to receive said X-and Y-position signals from said focal means and direct the output signal thereof to said X and Y adder circuit means, means for deriving a train of X-and Y-image position signals of predetermined amplitude and polarity following said Z control signal and applying same to said X and Y adder circuit means, means for deriving a train of Z intensity unblanking pulses from said Z-control signal timed to occur coincidentally with said X and Y image position signals, and a normally blanked oscilloscope means connected for receiving said Z unblanking pulses and output signals from said X and Y adder circuit means to correctly position various images of said train of X and Y image position signals on said oscilloscope means.

2. The multiple image positron camera defined in claim 1, wherein said image means additionally includes a first computer means and said focal means additionally includes a second computer means, said first computer means being connected to direct X-and Y-position signals therefrom to said pair of pulse stretch circuit means, said second computer means being connected to direct X-and Y-position signals therefrom to said pair of pulse stretching and decaying circuit means.

3. The multiple image positron camera defined in claim 1, wherein said means for deriving said train of X and Y image position signals includes a pulse stretch circuit means, a delay line means connected to said pulse stretching circuit means, a plurality of cathode follower means operatively connected in unequal spaced increments along said delay line means, and mixer circuit means operatively connected to at least one of said cathode follower means, said mixer circuit means being connected for applying said train of X and Y image position signals to said X and Y adder circuit means.

4. The multiple image positron camera defined in claim 3, wherein said means for deriving said train of Z intensity unblanking pulses includes said pulse stretch circuit means, said delay line means, said cathode follower means, a mixing circuit means operatively connected to said cathode follower means, a delay circuit means receiving the output of said mixing circuit means and directing a signal to a driver circuit means, said driver circuit means output being operatively connected to said oscilloscope means.

5. The multiple image positron camera defined in claim 4, wherein said means adapted for deriving said Z intensity control signal includes a coincidence circuit means connected to apply an output signal therefrom to said pulse stretch circuit means and connected to receive signals from a pair of pulse height selector means, one of said pulse height selector means being adapted to receive an input signal from said image means, the other of said pulse height selector means being adapted to receive an input signal from said focal means.

6. The multiple image positron camera defined in claim 1, wherein said means for deriving said Z intensity control signal includes a pair of pulse height selector means adapted to receive input signals from said image and focal means, said pulse height selector means each directing an output signal to a coincidence circuit means which produces an output signal only when signals are received from both of said pair of pulse height selector means, the output signal from said coincidence circuit means forming said Z intensity control signal.

7. The multiple image positron camera defined in claim 6, wherein said means for deriving said train of X and Y image position signals includes a pulse stretch circuit means connected to receive said Z intensity control signal from said coincidence circuit means and direct an output signal to a delay line means, said delay line means being connected to direct output signals to a plurality of cathode follower circuit means at unequal spaced increments therealong, a pair of mixer circuit means each operatively connected to at least one of said cathode follower means for receiving a signal therefrom and for directing an output signal thereof to said X and Y adder circuit means.

8. The multiple image positron camera defined in claim 7, wherein said means for deriving said train of Z intensity unblanking pulses includes a mixing circuit means operatively connected to receive signals from said plurality of cathode follower circuit means and direct an output thereof to a delay circuit means, and a driver circuit means connected to receive an output signal from said delay circuit means and direct an output to said oscilloscope means.

9. The multiple image positron camera defined in claim 8, wherein said plurality of cathode follower circuit means consists of six cathode follower circuits, each of said cathode follower circuits being connected to direct signals to one of said pair of mixer circuit means and to said mixing circuit means, two of said cathode follower circuits being additionally connected to direct signals to the other of said mixer circuit means, and wherein said oscilloscope means includes a screen capable of producing six separate images, each image corresponding to a signal from said one of said mixer circuit means and a signal from said mixing circuit means.

10. The multiple image positron camera defined in claim 9, wherein said image means includes an image scintillator-detector assembly and a first deflector computer means, said focal means including a focal scintillator-detector assembly and a second deflector computer means, said pair of pulse height selector means being connected intermediate said assemblies and said computer means to receive signals directly from said image and focal assemblies.

11. The multiple image positron camera defined in claim 1, wherein said means for deriving said train of X and Y image position signals includes a continuous waveform generator means connected for applying said train of X and Y image position signals to said X and Y adder circuit means.

12. The multiple image positron camera defined in claim 11, wherein said means for deriving said train of Z intensity unblanking pulses includes a pulse stretch circuit means the output of which is operatively connected to a first of a pair of serially connected gate circuit means, and said continuous waveform generator means operatively connected to each of said pair of gate circuit means, the output of a second of said pair of gate circuit means functioning as the Z intensity unblanking pulses.

13. The multiple image positron camera defined in claim 1, wherein each of said pulse stretching circuit means with time varying attenuation comprises a pulse stretching and decaying circuit means.

14. The multiple image positron camera defined in claim 1, wherein each of said pulse stretching circuit means with time varying attenuation comprises a pulse stretching and ramp generating circuit means.